US010003743B2

(12) United States Patent
S V et al.

(10) Patent No.: US 10,003,743 B2
(45) Date of Patent: Jun. 19, 2018

(54) METHOD, APPARATUS AND COMPUTER PROGRAM PRODUCT FOR IMAGE REFOCUSING FOR LIGHT-FIELD IMAGES

(71) Applicant: Nokia Technologies Oy, Espoo (FI)

(72) Inventors: Basavaraja S V, Bangalore (IN); Mithun Uliyar, Bangalore (IN); Gururaj Gopal Putraya, Bangalore (IN)

(73) Assignee: Nokia Technologies Oy, Espoo (FI)

( * ) Notice: Subject to any disclaimer, the term of this patent is extended or adjusted under 35 U.S.C. 154(b) by 432 days.

(21) Appl. No.: 14/572,033

(22) Filed: Dec. 16, 2014

(65) Prior Publication Data
US 2015/0181124 A1 Jun. 25, 2015

(30) Foreign Application Priority Data
Dec. 23, 2013 (IN) .............................. 6005/CHE/2013

(51) Int. Cl.
*H04N 13/02* (2006.01)
*H04N 5/232* (2006.01)
(Continued)

(52) U.S. Cl.
CPC ..... *H04N 5/23267* (2013.01); *G02B 27/0075* (2013.01); *G06T 5/003* (2013.01);
(Continued)

(58) Field of Classification Search
CPC ........... H04N 5/23232; H04N 13/0239; H04N 13/0296
(Continued)

(56) References Cited

U.S. PATENT DOCUMENTS 8,290,358 B1 10/2012 Georgiev
2010/0097442 A1* 4/2010 Lablans ................. G03B 5/00
348/36
(Continued)

OTHER PUBLICATIONS

Ng, et al. "Light-field Photography with a hand-held plenoptic camera." Stanford Tech Report. https://graphics.stanford.edu/papers/lfcamera/lfcamera-150dpi.pdf. Feb. 2005.*
(Continued)

*Primary Examiner* — Farzana Hossain
(74) *Attorney, Agent, or Firm* — Alston & Bird LLP

(57) ABSTRACT

In an example embodiment, a method, apparatus and computer program product are provided. The method includes facilitating receipt of a plurality of light-field images of a scene captured in a burst capture by a light-field camera. The method includes determining shifts between images of the plurality of light-field images, where the shifts between the images of the plurality of light-field images are associated with shake of the light-field camera while capturing the plurality of light-field images. The method includes generating a plurality of depth maps for the plurality of light-field images, and generating a set of view images of the scene based on the plurality of light-field images and the plurality of depth maps. The method includes generating a refocus image by combining the set of view images based at least on the shifts between the images of the plurality of light-field images.

26 Claims, 9 Drawing Sheets

(51) Int. Cl.
   *G02B 27/00*   (2006.01)
   *H04N 13/00*   (2018.01)
   *G06T 5/00*    (2006.01)
   *G06T 5/50*    (2006.01)
   *G06T 7/00*    (2017.01)
   *G02B 3/00*    (2006.01)

(52) U.S. Cl.
   CPC .............. *G06T 5/50* (2013.01); *G06T 7/97* (2017.01); *H04N 5/23212* (2013.01); *H04N 5/23258* (2013.01); *H04N 13/0022* (2013.01); *H04N 13/0271* (2013.01); *G02B 3/0006* (2013.01); *G06T 2207/10052* (2013.01)

(58) Field of Classification Search
   USPC .............................................. 348/42, 46, 48
   See application file for complete search history.

(56) References Cited

U.S. PATENT DOCUMENTS

| | | |
|---|---|---|
| 2013/0003184 A1 | 1/2013 | Duparre |
| 2013/0027512 A1 | 1/2013 | Aronsson et al. |
| 2013/0222633 A1 | 8/2013 | Knight et al. |
| 2015/0163406 A1* | 6/2015 | Laroia .................... G02B 27/58 348/208.1 |

OTHER PUBLICATIONS

Extended European Search Report received for corresponding European Patent Application No. 14196238.1, dated Jun. 1, 2015, 7 pages.

Venkataraman et al., "PiCam: An Ultra-Thin High Performance Monolithic Camera Array", ACM Transactions on Graphics, vol. 32, No. 6, Article No. 166, Nov. 2013, pp. 1-13.

Perwass et al. "Single Lens 3D-Camera With Extended Depth-of-Field", Proceedings of the SPIE Human Vision and Electronic Imaging, vol. 8291, Feb. 9, 2012, pp. 1-15.

Koch et al., "Plenoptic Modeling of 3D Scenes With a Sensor-Augmented Multi-Camera Rig", Tyrrhenian International Workshop on Digital Communication, Sep. 2002, 7 Pages.

"Computational Camera and Photography Lightfield Photography", MIT, Retrieved on Feb. 8, 2015, Webpage available at : http://www.mit.edu/~sysun/MAS531_lightfield.html.

Peer et al., "Panoramic Depth Imaging: Single Standard Camera Approach", International Journal of Computer Vision, vol. 47, 2002, pp. 149-160.

Bishop et al., "Plenoptic Depth Estimation From Multiple Aliased Views", IEEE 12th International Conference on Computer Vision Workshops, Sep. 27-Oct. 4, 2009, pp. 1-8.

Uliyar et al., "Fast EPI Based Depth for Plenoptic Cameras", IEEE International Conference on Image Processing, Sep. 15-18, 2013, pp. 1-4.

* cited by examiner

METHOD, APPARATUS AND COMPUTER PROGRAM PRODUCT FOR IMAGE REFOCUSING FOR LIGHT-FIELD IMAGES

TECHNICAL FIELD

Various implementations relate generally to method, apparatus, and computer program product for image refocusing for light-field images.

BACKGROUND

Various electronic devices, for example, cameras, mobile phones, and other multimedia devices are widely used for capturing image of a scene. Some of these devices also feature a light-field camera that includes a micro-lens array in addition to a main lens to capture four-dimensional (4D) light-field information (termed as light-field images) about the scene. For instance, an image sensor is positioned slightly behind the micro-lens array. By using such light-field images, displacement of image parts that are not in focus can be analyzed and depth information can be extracted. In various applications, desired parts of the light-field images may be refocused virtually on a computer device after the capture of the light-field images. In light-field image applications, a track length of the light-field camera should be large to estimate depth in the scene with better depth resolution. However, application of a large track length of the light-field camera in smaller hand-held devices, such as mobile phones, becomes challenging due to size constraints.

SUMMARY OF SOME EMBODIMENTS

Various aspects of examples embodiments are set out in the claims.

In a first aspect, there is provided a method comprising: facilitating receipt of a plurality of light-field images of a scene, the plurality of light-field images captured in a burst capture by a light-field camera; determining shifts between images of the plurality of light-field images, the shifts between the images of the plurality of light-field images associated with shake of the light-field camera while capturing the plurality of light-field images; generating a plurality of depth maps for the plurality of light-field images, wherein a depth map of the plurality of depth maps is generated for corresponding light-field image of the plurality of light-field images; generating a set of view images of the scene based on the plurality of light-field images and the plurality of depth maps; and generating a refocus image by combining the set of view images based at least on the shifts between the images of the plurality of light-field images.

In a second aspect, there is provided an apparatus comprising: at least one processor; and at least one memory comprising computer program code, the at least one memory and the computer program code configured to, with the at least one processor, cause the apparatus to perform at least: facilitate receipt of a plurality of light-field images of a scene, the plurality of light-field images captured in a burst capture by a light-field camera; determine shifts between images of the plurality of light-field images, the shifts between the images of the plurality of light-field images associated with shake of the light-field camera while capturing the plurality of light-field images; generate a plurality of depth maps for the plurality of light-field images, wherein a depth map of the plurality of depth maps is generated for corresponding light-field image of the plurality of light-field images; generate a set of view images of the scene based on the plurality of light-field images and the plurality of depth maps; and generate a refocus image by combining the set of view images based at least on the shifts between the images of the plurality of light-field images.

In a third aspect, there is provided a computer program product comprising at least one computer-readable storage medium, the computer-readable storage medium comprising a set of instructions, which, when executed by one or more processors, cause an apparatus to at least perform: facilitate receipt of a plurality of light-field images of a scene, the plurality of light-field images captured in a burst capture by a light-field camera; determine shifts between images of the plurality of light-field images, the shifts between the images of the plurality of light-field images associated with shake of the light-field camera while capturing the plurality of light-field images; generate a plurality of depth maps for the plurality of light-field images, wherein a depth map of the plurality of depth maps is generated for corresponding light-field image of the plurality of light-field images; generate a set of view images of the scene based on the plurality of light-field images and the plurality of depth maps; and generate a refocus image by combining the set of view images based at least on the shifts between the images of the plurality of light-field images.

In a fourth aspect, there is provided an apparatus comprising: means for facilitating receipt of a plurality of light-field images of a scene, the plurality of light-field images captured in a burst capture by a light-field camera; means for determining shifts between images of the plurality of light-field images, the shifts between the images of the plurality of light-field images associated with shake of the light-field camera while capturing the plurality of light-field images; means for generating a plurality of depth maps for the plurality of light-field images, wherein a depth map of the plurality of depth maps is generated for corresponding light-field image of the plurality of light-field images; means for generating a set of view images of the scene based on the plurality of light-field images and the plurality of depth maps; and means for generating a refocus image by combining the set of view images based at least on the shifts between the images of the plurality of light-field images.

In a fifth aspect, there is provided a computer program comprising program instructions which when executed by an apparatus, cause the apparatus to: facilitate receipt of a plurality of light-field images of a scene, the plurality of light-field images captured in a burst capture by a light-field camera; determine shifts between images of the plurality of light-field images, the shifts between the images of the plurality of light-field images associated with shake of the light-field camera while capturing the plurality of light-field images; generate a plurality of depth maps for the plurality of light-field images, wherein a depth map of the plurality of depth maps is generated for corresponding light-field image of the plurality of light-field images; generate a set of view images of the scene based on the plurality of light-field images and the plurality of depth maps; and generate a refocus image by combining the set of view images based at least on the shifts between the images of the plurality of light-field images.

BRIEF DESCRIPTION OF THE FIGURES

Various embodiments are illustrated by way of example, and not by way of limitation, in the figures of the accompanying drawings in which.

DETAILED DESCRIPTION

Example embodiments and their potential effects are understood by referring to FIGS. 1 through 9 of the drawings.

Figure 1:
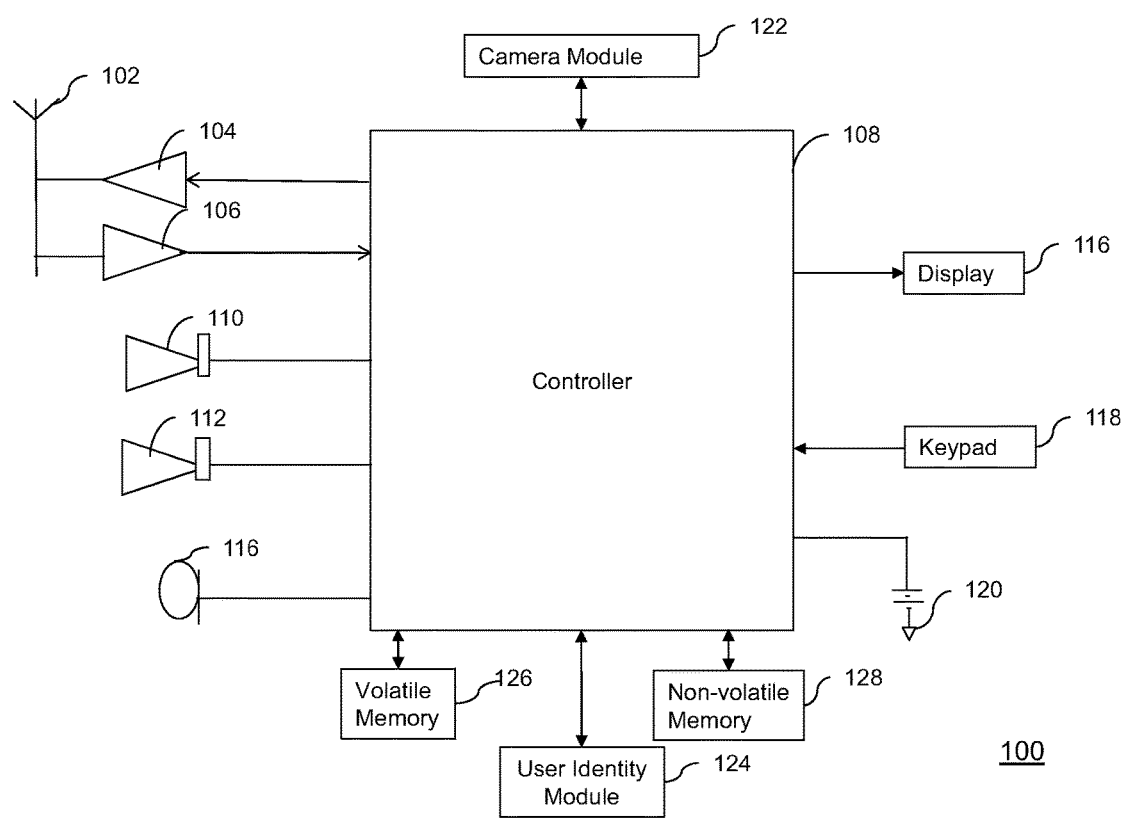
FIG. 1 illustrates a device, in accordance with an example embodiment.

FIG. 1 illustrates a device 100 in accordance with an example embodiment. It should be understood, however, that the device 100 as illustrated and hereinafter described is merely illustrative of one type of device that may benefit from various embodiments, therefore, should not be taken to limit the scope of the embodiments. As such, it should be appreciated that at least some of the components described below in connection with the device 100 may be optional and thus in an example embodiment may include more, less or different components than those described in connection with the example embodiment of FIG. 1. The device 100 could be any of a number of types of mobile electronic devices, for example, portable digital assistants (PDAs), pagers, mobile televisions, gaming devices, cellular phones, all types of computers (for example, laptops, mobile computers or desktops), cameras, audio/video players, radios, global positioning system (GPS) devices, media players, mobile digital assistants, or any combination of the aforementioned, and other types of communications devices.

The device 100 may include an antenna 102 (or multiple antennas) in operable communication with a transmitter 104 and a receiver 106. The device 100 may further include an apparatus, such as a controller 108 or other processing device that provides signals to and receives signals from the transmitter 104 and receiver 106, respectively. The signals may include signaling information in accordance with the air interface standard of the applicable cellular system, and/or may also include data corresponding to user speech, received data and/or user generated data. In this regard, the device 100 may be capable of operating with one or more air interface standards, communication protocols, modulation types, and access types. By way of illustration, the device 100 may be capable of operating in accordance with any of a number of first, second, third and/or fourth-generation communication protocols or the like. For example, the device 100 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA1000, wideband CDMA (WCDMA) and time division-synchronous CDMA (TD-SCDMA), with 3.9G wireless communication protocol such as evolved-universal terrestrial radio access network (E-UTRAN), with fourth-generation (4G) wireless communication protocols, or the like. As an alternative (or additionally), the device 100 may be capable of operating in accordance with non-cellular communication mechanisms. For example, computer networks such as the Internet, local area network, wide area networks, and the like; short range wireless communication networks such as include Bluetooth® networks, Zigbee® networks, Institute of Electric and Electronic Engineers (IEEE) 802.11x networks, and the like; wireline telecommunication networks such as public switched telephone network (PSTN).

The controller 108 may include circuitry implementing, among others, audio and logic functions of the device 100. For example, the controller 108 may include, but are not limited to, one or more digital signal processor devices, one or more microprocessor devices, one or more processor(s) with accompanying digital signal processor(s), one or more processor(s) without accompanying digital signal processor(s), one or more special-purpose computer chips, one or more field-programmable gate arrays (FPGAs), one or more controllers, one or more application-specific integrated circuits (ASICs), one or more computer(s), various analog to digital converters, digital to analog converters, and/or other support circuits. Control and signal processing functions of the device 100 are allocated between these devices according to their respective capabilities. The controller 108 thus may also include the functionality to convolutionally encode and interleave message and data prior to modulation and transmission. The controller 108 may additionally include an internal voice coder, and may include an internal data modem. Further, the controller 108 may include functionality to operate one or more software programs, which may be stored in a memory. For example, the controller 108 may be capable of operating a connectivity program, such as a conventional Web browser. The connectivity program may then allow the device 100 to transmit and receive Web content, such as location-based content and/or other web page content, according to a Wireless Application Protocol (WAP), Hypertext Transfer Protocol (HTTP) and/or the like. In an example embodiment, the controller 108 may be embodied as a multi-core processor such as a dual or quad core processor. However, any number of processors may be included in the controller 108.

The device 100 may also comprise a user interface including an output device such as a ringer 110, an earphone or speaker 112, a microphone 114, a display 116, and a user input interface, which may be coupled to the controller 108. The user input interface, which allows the device 100 to receive data, may include any of a number of devices allowing the device 100 to receive data, such as a keypad 118, a touch display, a microphone or other input device. In embodiments including the keypad 118, the keypad 118 may include numeric (0-9) and related keys (#, *), and other hard and soft keys used for operating the device 100. Alternatively or additionally, the keypad 118 may include a conventional QWERTY keypad arrangement. The keypad 118 may also include various soft keys with associated functions. In addition, or alternatively, the device 100 may include an interface device such as a joystick or other user input interface. The device 100 further includes a battery 120, such as a vibrating battery pack, for powering various circuits that are used to operate the device 100, as well as optionally providing mechanical vibration as a detectable output.

In an example embodiment, the device 100 includes a media capturing element, such as a camera, video and/or audio module, in communication with the controller 108. The media capturing element may be any means for capturing an image, video and/or audio for storage, display or transmission. In an example embodiment in which the media capturing element is a camera module 122, the camera module 122 may include a digital camera capable of forming a digital image file from a captured image. As such, the camera module 122 includes all hardware, such as a lens or other optical component(s), and software for creating a digital image file from a captured image. Alternatively, the camera module 122 may include the hardware needed to view an image, while a memory device of the device 100 stores instructions for execution by the controller 108 in the form of software to create a digital image file from a captured image. In an example embodiment, the camera module 122 may further include a processing element such as a co-processor, which assists the controller 108 in processing image data and an encoder and/or decoder for compressing and/or decompressing image data. The encoder and/or decoder may encode and/or decode according to a JPEG standard format or another like format. For video, the encoder and/or decoder may employ any of a plurality of standard formats such as, for example, standards associated with H.261, H.262/MPEG-2, H.263, H.264, H.264/MPEG-4, MPEG-4, and the like. In some cases, the camera module 122 may provide live image data to the display 116. Moreover, in an example embodiment, the display 116 may be located on one side of the device 100 and the camera module 122 may include a lens positioned on the opposite side of the device 100 with respect to the display 116 to enable the camera module 122 to capture images on one side of the device 100 and present a view of such images to the user positioned on the other side of the device 100.

The device 100 may further include a user identity module (UIM) 124. The UIM 124 may be a memory device having a processor built in. The UIM 124 may include, for example, a subscriber identity module (SIM), a universal integrated circuit card (UICC), a universal subscriber identity module (USIM), a removable user identity module (R-UIM), or any other smart card. The UIM 124 typically stores information elements related to a mobile subscriber. In addition to the UIM 124, the device 100 may be equipped with memory. For example, the device 100 may include volatile memory 126, such as volatile random access memory (RAM) including a cache area for the temporary storage of data. The device 100 may also include other non-volatile memory 128, which may be embedded and/or may be removable. The non-volatile memory 128 may additionally or alternatively comprise an electrically erasable programmable read only memory (EEPROM), flash memory, hard drive, or the like. The memories may store any number of pieces of information, and data, used by the device 100 to implement the functions of the device 100.

Figure 2:
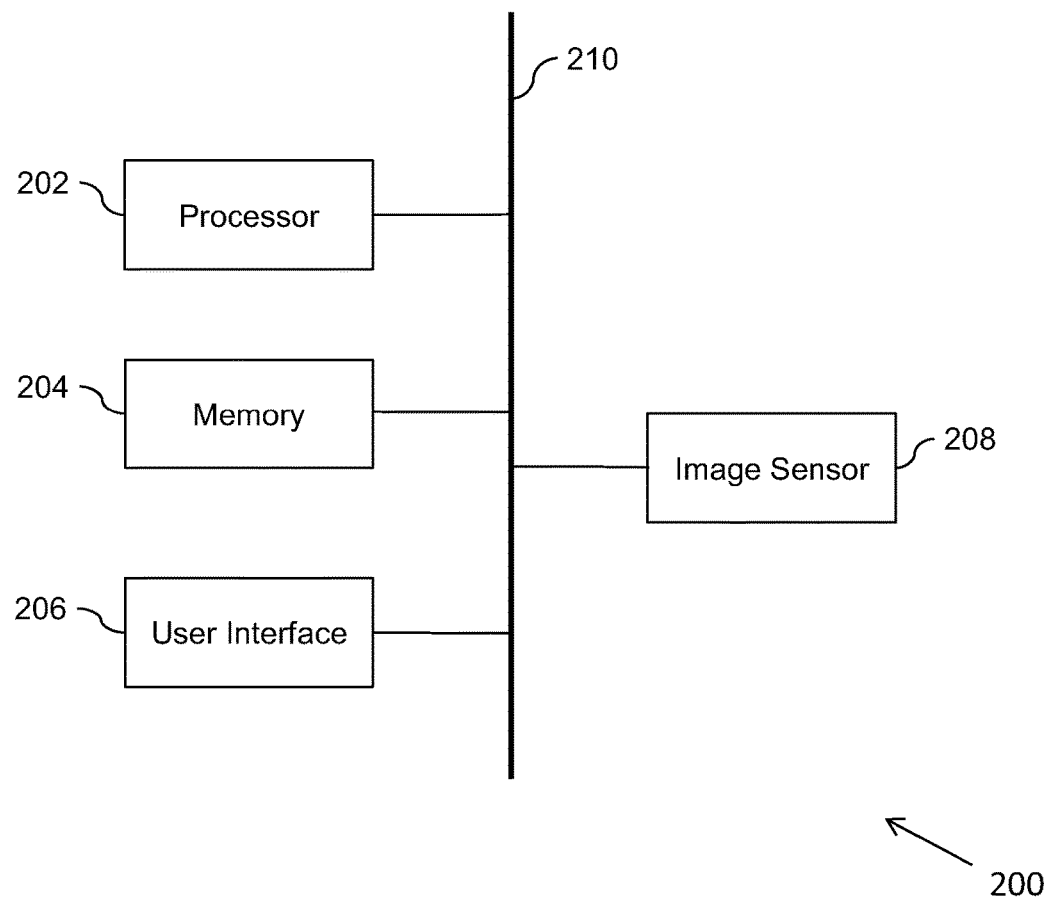
FIG. 2 illustrates an apparatus for image refocusing of images captured from a light-field camera, in accordance with an example embodiment.

FIG. 2 illustrates an apparatus 200 for image refocusing for light-field images, in accordance with an example embodiment. The apparatus 200 may be employed, for example, in the device 100 of FIG. 1. However, it should be noted that the apparatus 200, may also be employed on a variety of other devices both mobile and fixed, and therefore, embodiments should not be limited to application on devices such as the device 100 of FIG. 1. Alternatively, embodiments may be employed on a combination of devices including, for example, those listed above. Accordingly, various embodiments may be embodied wholly at a single device, for example, the device 100 or in a combination of devices. Furthermore, it should be noted that the devices or elements described below may not be mandatory and thus some may be omitted in certain embodiments.

The apparatus 200 includes or otherwise is in communication with at least one processor 202 and at least one memory 204. Examples of the at least one memory 204 include, but are not limited to, volatile and/or non-volatile memories. Some examples of the volatile memory include, but are not limited to, random access memory, dynamic random access memory, static random access memory, and the like. Some examples of the non-volatile memory include, but are not limited to, hard disks, magnetic tapes, optical disks, programmable read only memory, erasable programmable read only memory, electrically erasable programmable read only memory, flash memory, and the like. The memory 204 may be configured to store information, data, applications, instructions or the like for enabling the apparatus 200 to carry out various functions in accordance with various example embodiments. For example, the memory 204 may be configured to buffer input data comprising media content for processing by the processor 202. Additionally or alternatively, the memory 204 may be configured to store instructions for execution by the processor 202.

An example of the processor 202 may include the controller 108. The processor 202 may be embodied in a number of different ways. The processor 202 may be embodied as a multi-core processor, a single core processor; or combination of multi-core processors and single core processors. For example, the processor 202 may be embodied as one or more of various processing means such as a coprocessor, a microprocessor, a controller, a digital signal processor (DSP), processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an example embodiment, the multi-core processor may be configured to execute instructions stored in the memory 204 or otherwise accessible to the processor 202. Alternatively or additionally, the processor 202 may be configured to execute hard coded functionality. As such, whether configured by hardware or software methods, or by a combination thereof, the processor 202 may represent an entity, for example, physically embodied in circuitry, capable of performing operations according to various embodiments while configured accordingly. For example, if the processor 202 is embodied as two or more of an ASIC, FPGA or the like, the processor 202 may be specifically configured hardware for conducting the operations described herein. Alternatively, as another example, if the processor 202 is embodied as an executor of software instructions, the instructions may specifically configure the processor 202 to perform the algorithms and/or operations described herein when the instructions are executed. However, in some cases, the processor 202 may be a processor of a specific device, for example, a mobile terminal or network device adapted for employing embodiments by further configuration of the processor 202 by instructions for performing the algorithms and/or operations described herein. The processor 202 may include, among other things, a clock, an arithmetic logic unit (ALU) and logic gates configured to support operation of the processor 202.

A user interface 206 may be in communication with the processor 202. Examples of the user interface 206 include, but are not limited to, input interface and/or output interface. The input interface is configured to receive an indication of a user input. The output user interface provides an audible, visual, mechanical or other output and/or feedback to the user. Examples of the input interface may include, but are not limited to, a keyboard, a mouse, a joystick, a keypad, a touch screen, soft keys, and the like. Examples of the output interface may include, but are not limited to, a display such as light emitting diode display, thin-film transistor (TFT) display, liquid crystal displays, active-matrix organic light-emitting diode (AMOLED) display, a microphone, a speaker, ringers, vibrators, and the like. In an example embodiment, the user interface 206 may include, among other devices or elements, any or all of a speaker, a microphone, a display, and a keyboard, touch screen, or the like. In this regard, for example, the processor 202 may comprise user interface circuitry configured to control at least some functions of one or more elements of the user interface 206, such as, for example, a speaker, ringer, microphone, display, and/or the like. The processor 202 and/or user interface circuitry comprising the processor 202 may be configured to control one or more functions of one or more elements of the user interface 206 through computer program instructions, for example, software and/or firmware, stored on a memory, for example, the at least one memory 204, and/or the like, accessible to the processor 202.

In an example embodiment, the apparatus 200 may include an electronic device. Some examples of the electronic device include communication device, media capturing device with or without communication capabilities, computing devices, and the like. Some examples of the electronic device may include a mobile phone, a personal digital assistant (PDA), and the like. Some examples of computing device may include a laptop, a personal computer, and the like. In an example embodiment, the electronic device may include a user interface, for example, the user interface 206, having user interface circuitry and user interface software configured to facilitate a user to control at least one function of the electronic device through use of a display and further configured to respond to user inputs. In an example embodiment, the electronic device may include a display circuitry configured to display at least a portion of the user interface 206 of the electronic device. The display and display circuitry may be configured to facilitate the user to control at least one function of the electronic device.

In an example embodiment, the electronic device may be embodied as to include a transceiver. The transceiver may be any device operating or circuitry operating in accordance with software or otherwise embodied in hardware or a combination of hardware and software. For example, the processor 202 operating under software control, or the processor 202 embodied as an ASIC or FPGA specifically configured to perform the operations described herein, or a combination thereof, thereby configures the apparatus or circuitry to perform the functions of the transceiver. The transceiver may be configured to receive media content. Examples of the media content may include audio content, video content, data, and a combination thereof.

Figure 3:
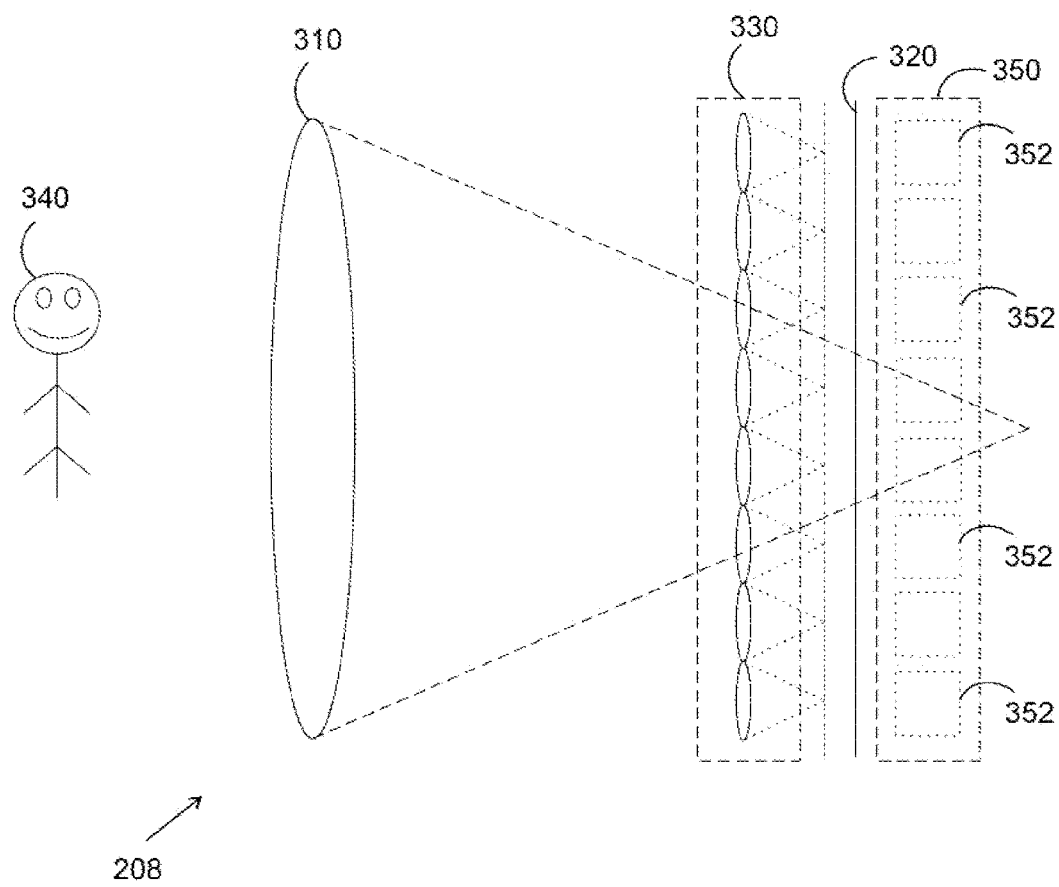
FIG. 3 illustrates an example representation of a light-field camera.

In an example embodiment, the electronic device may be embodied as to include a light-field camera 208. In various example embodiments, the light-field camera 208 is capable of capturing light coming from the scene such that multiple views of the scene can be generated from a single image, and various parts of the scene can be refocused after the capture of the image. The light-field camera 208 may be in communication with the processor 202 and/or other components of the apparatus 200. The light-field camera 208 may be in communication with other imaging circuitries and/or software, and is configured to capture digital images or to make a video or other graphic media files. The light-field camera 208 and other circuitries, in combination, may be an example of at least one camera module such as the camera module 122 of the device 100. In an example embodiment, the light-field camera 208 may include a main lens, a sensor, and a plurality of micro-lenses placed between the main lens and the sensor. An example of the light-field camera is shown in FIG. 3.

These components (202-208) may communicate to each other via a centralized circuit system 210 to image refocusing in images captured by the light-field camera 208. The centralized circuit system 210 may be various devices configured to, among other things, provide or enable communication between the components (202-208) of the apparatus 200. In certain embodiments, the centralized circuit system 210 may be a central printed circuit board (PCB) such as a motherboard, main board, system board, or logic board. The centralized circuit system 210 may also, or alternatively, include other printed circuit assemblies (PCAs) or communication channel media.

In an example embodiment, the processor 202 is configured to, with the content of the memory 204, and optionally with other components described herein, to cause the apparatus 200 to facilitate receipt of a plurality of light-field images of a scene. In an example embodiment, the plurality of light-field images may be captured by a light-field camera (also termed as a plenoptic camera) such as the light-field camera 208. Herein, the 'scene' refers to arrangement (natural, manmade, sorted or assorted) of one or more objects of which the images or videos can be captured, or of which the preview can be generated. In this example embodiment, the plurality of light-field images are captured by the light-field camera that may be present in the apparatus 200. In another example embodiment, the apparatus 200 may be caused to send instructions for capturing of the plurality of light-field images of the scene by an external light-field camera that is accessible/communicably coupled to the apparatus 200. Herein, the light-field camera includes any camera that is capable of capturing image/video data of the scene, such that multiple views of the same scene may be generated, and different regions of the light-field images/videos may be refocused after the capture of the light-field images/videos. In some example embodiments, the plurality of light-field images may be prerecorded or stored in an apparatus 200, or may be received from sources external to the apparatus 200. In such example embodiments, the apparatus 200 is caused to receive the plurality of light-field images from external storage medium such as DVD, Compact Disk (CD), flash drive, memory card, or from external storage locations through Internet, Bluetooth®, and the like. In an example embodiment, a processing means may be configured to facilitate capture of the plurality of light-field images of the scene including the foreground object. An example of the processing means may include the processor 202, which may be an example of the controller 108, and/or the light-field camera 208.

In an example embodiment, the plurality of light-field images are captured as a burst capture mode by the light-field camera 208. It should be noted that there may be a shake in the light-field camera 208 while capturing the plurality of light-field images. For example, while capturing the light-field images in the burst manner, there may be shake in the light-field camera 208 due to reasons including, but not limited to, handshake or other vibrations. In an example representation, it may be assumed that the apparatus 200 is caused to capture four light-field images I1, I2, I3 and I4 as burst images by the light-field camera 208. It should be noted that example of four light-field images (I1-I4) merely serve as example only and in fact any number of successive light-field images may be captured as the burst capture by the light-field camera 208.

In various scenarios, as the relative position of the light-field camera 208 may change while capturing the burst light-field images, there may be a relative shift (for example, displacement) between the individual light-field images, for example, between images I1 and I2 that are captured in the burst manner. In these scenarios, relative shifts of the individual light-field images of the light-field images (I1-I4) are attributed to shake of the light-field camera 208 while capturing the light-field images (I1-I4).

In an example embodiment, the apparatus 200 is caused to determine shifts between the images of the plurality of light-field images (I1-I4). In an example embodiment, shifts between the images (I1-I4) and a reference light-field image may be determined. In an example embodiment, the reference light-field image may be selected from the plurality of light-field images (I1-I4). For instance, the light-field image I1 may be selected as the reference light-field image. In an example embodiment, the corresponding shifts of the light-field images I1, I2, I3 and I4 are determined with respect to the light-field image I1. In this example embodiment, shift between any image pair (of images I1-I4) may also be determined using the shifts between the images I2, I3, I4 and the image I1. In an example embodiment, a processing means may be configured to determine shifts between the images of the plurality of light-field images (I1-I4). An example of the processing means may include the processor 202, which may be an example of the controller 108, and/or the light-field camera 208 including gyroscope.

In an example embodiment, the apparatus 200 is caused to determine the shifts between the light-field images based on changes in positions of the light-field camera 208 while capturing the plurality of light-field images. In an example embodiment, the apparatus 200 is caused to determine the position of the light-field camera 208 at instants of capture of the light-field images (I1-I4) based on one or more positional measurements performed at instants of capturing the plurality of light-field images (I1-I4). In an example embodiment, a gyroscope may be used to perform the positional measurements (for example, measuring X, Y and Z positions). In some example embodiments, accelerometers may also be used with or without gyroscope for the positions measurements of the light-field camera 208. In an example embodiment, the apparatus 200 is caused to calculate the shifts between the light-field images of the plurality of images (I1-I4) based on the changes in the positions of the light-field camera 208 at the instants of capture of the light-field images (I1-I4). In an example embodiment, a processing means may be configured to determine shifts between the images of the plurality of light-field images (I1-I4). An example of the processing means may include the processor 202, which may be an example of the controller 108, and/or the light-field camera 208 including gyroscope.

In another example embodiment, the apparatus 200 is caused to calculate the shifts of the light-field images of the plurality of images (I1-I4) with reference to a reference light-field image (for example, image I1), based on the changes in the positions of the light-field camera 208 at the instants of capture of the images I1-I4 with respect to a reference position. In such an example embodiment, the reference position of the light-field camera 208 may be a position of the light-field camera 208 at an instant of capture of the reference light-field image, for example, image I1. In this example embodiment, the apparatus 200 is caused to calculate the shifts of the light-field images of the plurality of images (I1-I4) with reference to the reference light-field image (for example, image I1), based on the changes in the positions of the light-field camera 208 with respect to the reference position determined.

In another alternate example embodiment, the relative shift between two light-field images may be determined by selecting a reference light-field image from the plurality of light-field images and performing image registration of the plurality of light-field images (I1-I4) with the reference light-field image (I1). For instance, the light-field image I1 may be selected as the reference light-field image and the light-field images (I2-I4) may be registered with the light-field image I1 using image registration techniques known in the state of the art. In this example embodiment, the shifts between the images of the plurality of light-field images (I1-I4) may be determined based on the image registration of the plurality of light-field images (I1-I4) with the reference light-field image (I1). In an example embodiment, the relative shift between two light-field images, for example light-field images I1 and I2 may be determined by matching corresponding pixels in the light-field images I1 and I2, and finding difference in the locations of the corresponding pixels in the light-field images I1 and I2. Additionally or alternatively, difference in the positions of the corner point pixels in both light-field images I1 and I2 may be determined to obtain the shift between the light-field images I1 and I2. It should be noted that other image registration methods may also be used to find respective shifts between the light-field images (I1-I4) and the reference light-field image (I1). In an example, it may be assumed that a shift of the light-field image I2 with respect to the light-field image I1 is s0, where s0=0, a shift of the light-field image I2 with respect to the light-field image I1 is s1, a shift of the light-field image I3 with respect to the light-field image I1 is s2, and a shift of the light-field image I4 with respect to the light-field image I1 is s3.

In an example embodiment, the apparatus 200 is caused to generate a plurality of depth maps for the plurality of light-field images (I1-I4). In an example embodiment, for each light-field image, a corresponding depth map is generated. For example, depth maps d1, d2, d3 and d4 may be generated corresponding to the light-field images I1, I2, I3 and I4, respectively. The depth maps (d1-d4) for the light-field images I1-I4 may be generated by many suitable techniques known in the state of art. One such technique is set forth in Mithun Uliyar, Gururaj Putraya and Basavaraja Sv, "Fast EPI Based Depth for Plenoptic Cameras" in 2013 *IEEE International conference on Image processing* (*ICIP* 2013). In an example embodiment, a processing means may be configured to generate the plurality of depth maps for the plurality of light-field images (I1-I4). An example of the processing means may include the processor 202, which may be an example of the controller 108, and/or the light-field camera 208.

In an example embodiment, the apparatus 200 is caused to generate a set of view images of the scene based on the plurality of light-field images and the plurality of depth maps. For instance, the apparatus 200 is caused to generate the set of view images based on the light-field images (I1-I4) and the plurality of depth maps (d1-d4). In an example embodiment, each view image of the set of view images has a distinct view of the scene. In an example embodiment, the set of view images includes a plurality of groups of view images, where each group of view images are generated based on a light-field image of the plurality of light-field images and a corresponding depth map of the light-field image. For example, the apparatus 200 may be caused to generate view images I11, I12, I13, I14 based on the light-field image I1 and the depth map d1, caused to generate view images I21, I22, I23, I24 based on the light-field image I2 and the depth map d2, caused to generate view images I31, I32, I33, I34 based on the light-field image I3 and the depth map d3, and caused to generate view images I41, I42, I43, I44 based on the light-field image I4 and the depth map d4. In an example embodiment, a processing means may be configured to generate the set of view images of the scene based on the plurality of light-field images (I1-I4) and the plurality of depth maps (d1-d4). An example of the processing means may include the processor 202, which may be an example of the controller 108, and/or the light-field camera 208.

In an example embodiment, the apparatus 200 is caused to generate a refocus image by combining the set of view images based at least on the plurality of shifts between the images of the plurality of light-field images. In an example embodiment, the apparatus 200 is caused to generate the refocus image by selecting a view image of the set of view images, shifting one or more view images of the set of view images corresponding to respective shifts of the one or more view images with respect to the selected view image, and adding the one or more shifted images to the selected image to generate the refocus image. In an example embodiment, a processing means may be configured to generate a refocus image by combining the set of view images based at least on the plurality of shifts between the images of the plurality of images. An example of the processing means may include the processor 202, which may be an example of the controller 108, and/or the light-field camera 208. Some example embodiments of generating the refocus image are described with reference to FIG. 6.

In the example embodiment, the apparatus 200 is also caused to generate a refined depth map based on the images I1 to I4. In another example embodiment, the apparatus 200 is also caused to generate a refined depth map based on the images I1, I11, I12, I13, I14, I2, I21, I22, I23, I24, I3, I31, I32, I33, I34, I4, I41, I42, I43 and I44.

FIG. 3 represents an example representation of the light-field camera 208. The light-field camera 208 includes a main lens 310, a sensor 320 and a micro-lens array 330 positioned between the main lens 310 and the sensor 320. Light is collected at the sensor 320 from various angles through the micro-lens array 330. In various scenarios, several images of portions of an object 340 (example of a scene) present in front of the light-field camera 208 are generated by the micro-lens array 330 onto the sensor 320. In an example, several micro-lenses of the micro-lens array 330 project a beam coming to them from the main lens 310 onto different parts of the sensor 320 thereby creating multiple instances of an object point (belonging to the object 340) onto multiple locations of the sensor 320. For instance, the micro-lens array 330 is capable of generating a light-field image data 350 corresponding to the object 340. In an example embodiment, the light-field image data 350 may be stored in the memory 204, or any other storage location embodied in the apparatus 200 or otherwise accessible to the apparatus 200. It should be noted that the light-field image data 350 includes a plurality of sub-images (for example, shown by 352), where each sub-image may include image information for at least a portion of the object 340. The light-field image data 350 generated by the micro-lens array 320 is used to generate multiple view images of the object 340.

Figure 4:
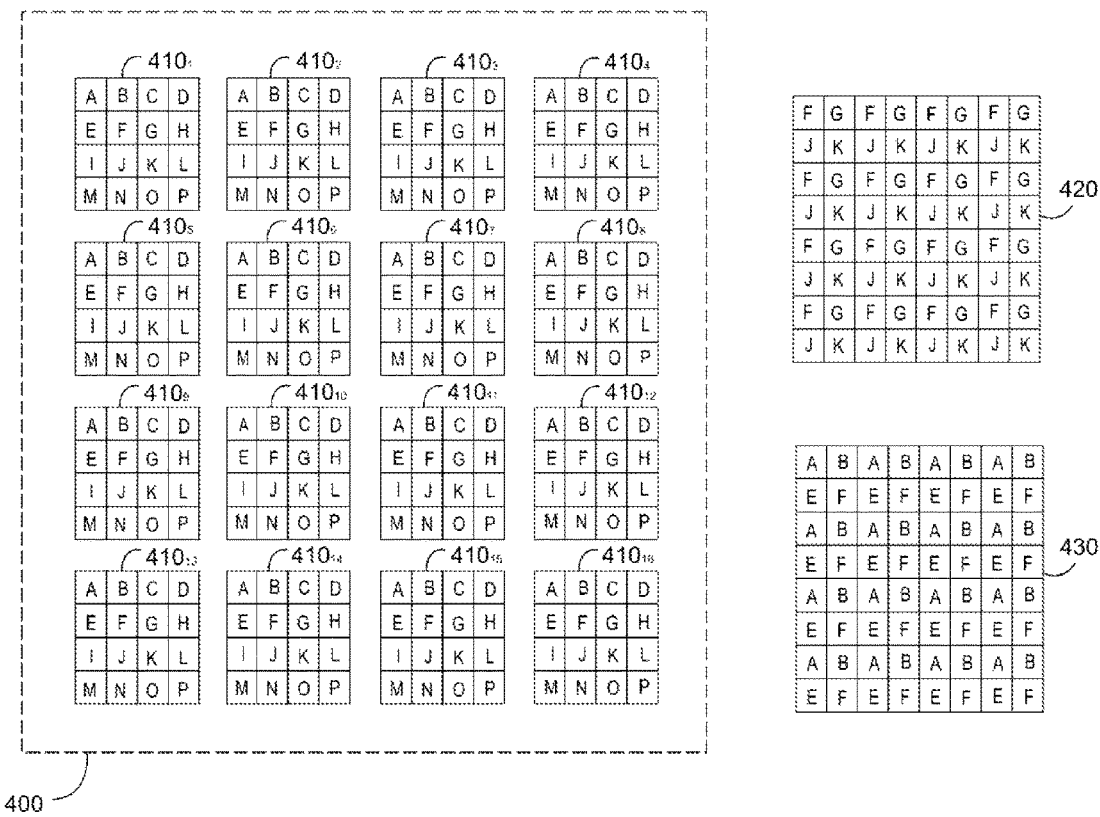
FIG. 4 illustrates an example representation of generation of a view image from a light-field image, in accordance with an example embodiment.

An example representation of combining the plurality of sub-images generated by the micro-lens array 330 to generate a view image is shown in FIG. 4. FIG. 4 represents an example representation of generation of a view image from light-field image data 400 (an example of the light-field image data 350), in accordance with an example embodiment. The light-field image data 400 corresponds to a light-field image captured by the light-field camera 208. The light-field image data 400 includes a plurality of sub-images formed on the sensor 320. An example representation of the sub-images is shown by $410_1$, $410_2$, $410_3$ ... $410_{16}$. In this example representation, each of the sub-images $410_1$, $410_2$, $410_3$ ... $410_{16}$ are shown as including 4*4 pixels (total of 16 pixels) for example purposes only. In an example embodiment, multiple views of the scene may be generated by concatenating some pixels of the sub-images $410_1$, $410_2$, $410_3$ ... $410_{16}$ in a pre-determined order. As shown in the example representation of FIG. 4, the four central pixels of each of the sub-images $410_1$, $410_2$, $410_3$ ... $410_{16}$ are represented by English alphabet characters "FGJK". In this example embodiment, the central pixels (shown as FGJK) of the sub-images ($410_1$-$410_{16}$) of the light-field image data 400 are concatenated to generate the view 420 of the scene. In this example representation, the four left corner pixels of each of the sub-images ($410_1$-$410_{16}$) are represented by English alphabet characters "ABEF". In this example, the four left corner pixels (shown as ABEF) of the sub-images ($410_1$-$410_{16}$) of the light-field image data 400 are concatenated to generate the view 430 of the scene.

It should be noted that each of the sub-images $410_1$, $410_2$, $410_3$ ... $410_{16}$ may represent at least a portion of the object 340. In an example embodiment, a set of pixels of the sub-images $410_1$, $410_2$, $410_3$ ... $410_{16}$ are concatenated to generate the views such as the views 420, 430 and the like. In an example embodiment, the number of pixels in the set of pixels (also termed as size of the set of pixels) depends upon a depth (obtained from the depth map of the light-field image data 400) of regions in the images $410_1$, $410_2$, $410_3$ ... $410_{16}$.

Figure 5:
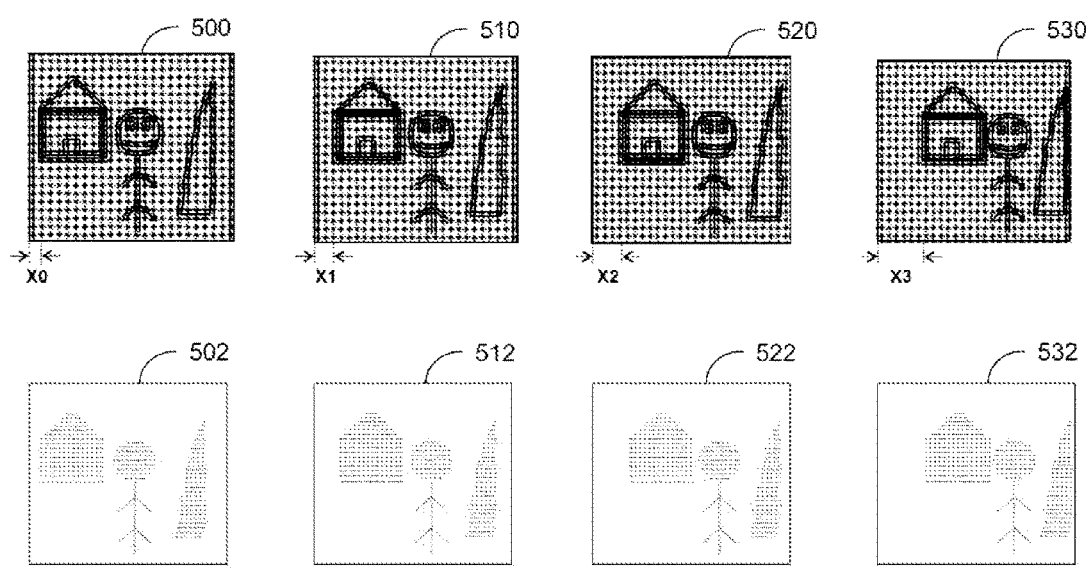
FIG. 5 illustrates an example representation of a plurality of light-field images and corresponding depth maps, in accordance with an example embodiment.
Figure 6:
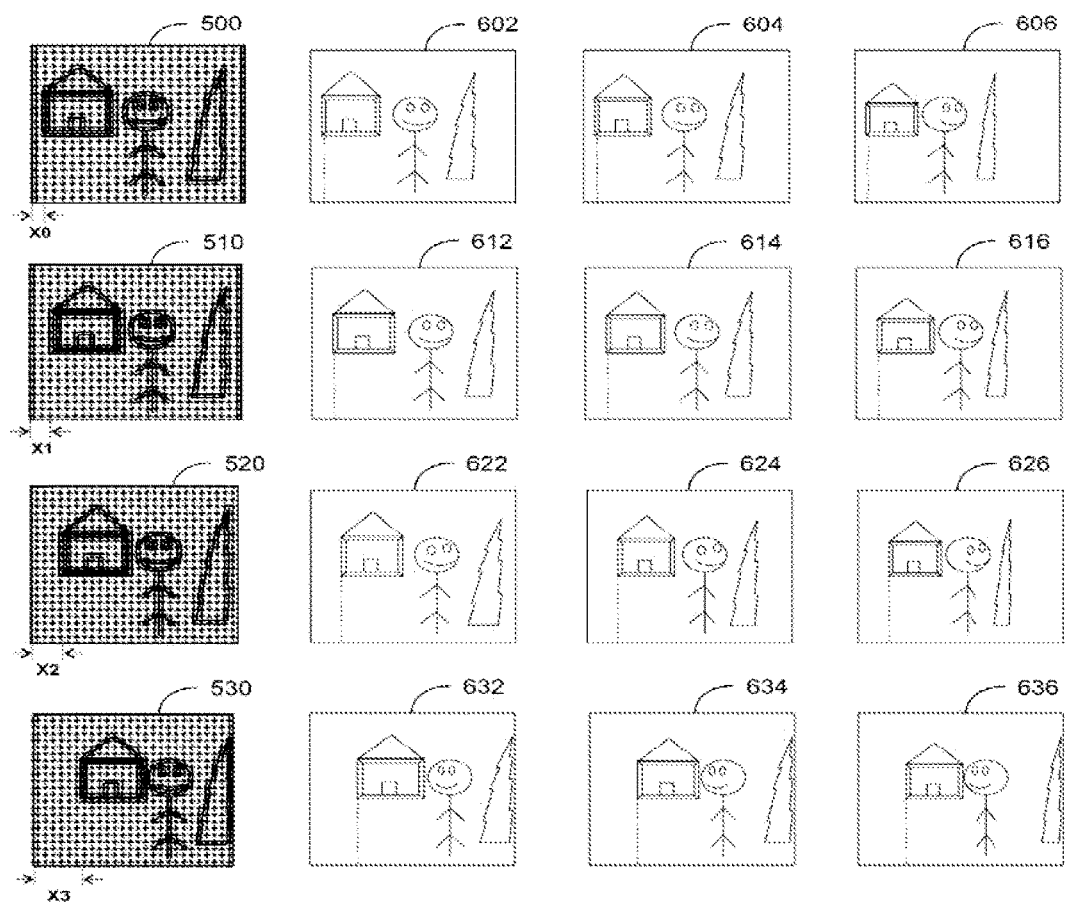
FIG. 6 illustrated a set of view images generated from a plurality of light-field images, in accordance with an example embodiment.

Some example embodiments of generating refocus images from the light-field images captured or otherwise accessible by the apparatus 200 are further described with reference to FIGS. 5 and 6. FIGS. 5 and 6 are provided for the representation of an example only, and should not be considered limiting to the scope of the various example embodiments.

FIG. 5 illustrates an example representation of a plurality of light-field images and corresponding depth maps, in accordance with an example embodiment. The light-field camera, such as the light-field camera 208, may be embodied in the apparatus 200, or otherwise communicably accessible to the apparatus 200. In this example, light-field images 500, 510, 520 and 530 of a scene are captured in a burst manner. As described with reference to FIG. 3, there may be relative shifts between the light-field images 500-530 due to shake in the light-field camera 208 while capturing the light-field images 500-530 in the burst manner. As described with reference to FIG. 2, the relative shifts between the light-field images 500-530 may be determined based on through positional measurements by gyroscope and the like, or based on differences in the locations of corresponding pixels in the light-field images 500-530.

As shown in FIG. 5, the relative shifts between images may also be obtained based on differences in the locations of corresponding pixels in the light-field images 500-530. For example, if an edge or a corner pixel is at a distance X0 from a reference in the light-field image 500, and if the edge or the corner pixel is at a distance X1 from the reference in the light-field image 510, the shift between the light-field image 510 and the reference light-field image (for example, the reference light-field image 500) may be s1 where s1 is equal to x1 minus x0. Similarly, the shift between the light-field image 520 and the reference light-field image 500 may be s2, where s2 is equal to x2 minus x0; and the shift between the light-field image 530 and the reference image 500 may be s3 where s3 is equal to x3 minus x0.

In this representation, depth maps 502, 512, 522 and 532 are also shown. The depth maps 502, 512, 522 and 532 are generated for the plurality of light-field images 500, 510, 520 and 530, respectively. For instance, the depth map 502 may be generated by any suitable technique that is able to determine displacement in corresponding positions of a same object point in various sub-images of the light-field image 500.

FIG. 6 illustrates a set of view images generated from the light-field images 500, 510, 520 and 530. For instance, the view images 602, 604 and 606 are generated from the light-field image 500. In an example embodiment, each of the view images 602, 604 and 606 represent different views of the scene. In an example embodiment, the view images 602, 604 and 606 with different views of the scene are generated using the depth map 502. In this example representation, the view images 612, 614 and 616 are generated from the light-field image 510. In an example embodiment, each of the view images 612, 614 and 616 represent different views of the scene and are generated using the depth map 512. In this example representation, the view images 622, 624 and 626 are generated from the light-field image 520. In an example embodiment, each of the view images 622, 624 and 626 represent different views of the scene and are generated using the depth map 522. In this example representation, the view images 632, 634 and 636 are generated from the light-field image 530. In an example embodiment, each of the view images 632, 634 and 636 represent different views of the scene and are generated using the depth map 532.

In an example embodiment, the apparatus 200 may be caused to generate a refined depth map based on the light-field image 500 and the view images generated from the light-field image 500 (for example, 602, 604 and 606), the light-field image 510 and the view images generated from the light-field image 510 (for example, 612, 614 and 616), the light-field image 520 and the view images generated from the light-field image 520 (for example, 622, 624 and 626) and the light-field image 530 and the view images generated from the light-field image 530 (for example, 632, 634 and 636).

In an example embodiment, the apparatus 200 is caused to generate a refocus image by combining the set of view images based at least on the shifts of the images of the plurality of light-field images with respect to the reference light-field image. For instance, in this example representation of FIG. 6, a refocus image may be generated by using the images from 12 view images, for example, the view images 602, 604 and 606 that are generated by the light-field image 500, the view images 612, 614 and 616 that are generated by the light-field image 510, the view images 622, 624 and 626 that are generated by the light-field image 520, and the view images 632, 634 and 636 that are generated by the light-field image 530.

In an example embodiment, two or more view images of the set of view images 602-606, 612-616, 622-626, and 632-636 may be combined in a shift and add manner to generate the refocus image. In an example, it may be assumed that the relative shift between the light-field image 500 and the light-field image 510 is s1, between the light-field image 500 and the light-field image 520 is s2 and between the light-field image 500 and the light-field image 530 is s3. Further, there would shifts between the view images generated from a same light-field image. For instance, there may be shifts such as $\Delta 1$, $\Delta 2$, between the view images 602 and 604, and between the view images 602 and 606, respectively. Similarly, there may be shifts such as $\alpha 1$, $\alpha 2$ between the view images 612 and 614, and between the view images 612 and 616, respectively; and there may be shifts such as $\beta 1$, $\beta 2$, between the view images 622 and 624, and between the view images 622 and 626, respectively; and there may be shifts such as $\gamma 1$, $\gamma 2$, between the view images 632 and 634, and between the view images 632 and 636, respectively.

In an example embodiment, two or more view images of the set of view images 602-606, 612-616, 622-626, and 632-636 may be combined to generate the refocus image. For example, a view image, for example, the view image 602 from the set of view images may be selected. Further, one or more view images may be shifted corresponding to respective shifts of the one or more view images with respect to the selected view image 602 to generate one or more shifted view images. For instance, one or more images, for example, the view images 614 and 626 may be shifted corresponding to their respective shifts with respect to the view image 602 to generate a shifted view image of the view image 614 and a shifted view image of the view image 626. In this example, the view image 614 may be shifted by s1 plus $\alpha 1$ to generate the shifted view image of the view image 614, and the view image 626 may be shifted by s2 plus $\beta 2$ to generate a shifted view image of the view image 626. Further, the selected view image 602, the shifted view image of the view image 614 and the shifted view image of the view image 626 may be added to generate the refocus image. In an example embodiment, any number of view images from the view images 602, 604, 606, 612, 614, 616, 622, 624, 626, 632, 634 and 636 may be combined in the shift and add manner to generate the refocus image.

It should be noted that combining the set of view images (for example, 602-606, 612-616, 622-626 and 632-636) that are generated from the light-field images (500, 510, 520 and 530) captured in a burst manner, provide better refocusing compared to combining view images generated from a single light-field image, for example, from any one light-field image 500, 510, 520 or 530.

The apparatus 200 may also be caused to generate a refined depth map based on the light-field images (500-530) and the set of view images (602-606, 612-616, 622-626 and 632-636). It should be noted that due to relative shifts between the light-field images, and in turn, between the set of view images, there is a better depth estimation as compared to a depth estimation in case of the view images generated from a single light-field image.

Figure 7:
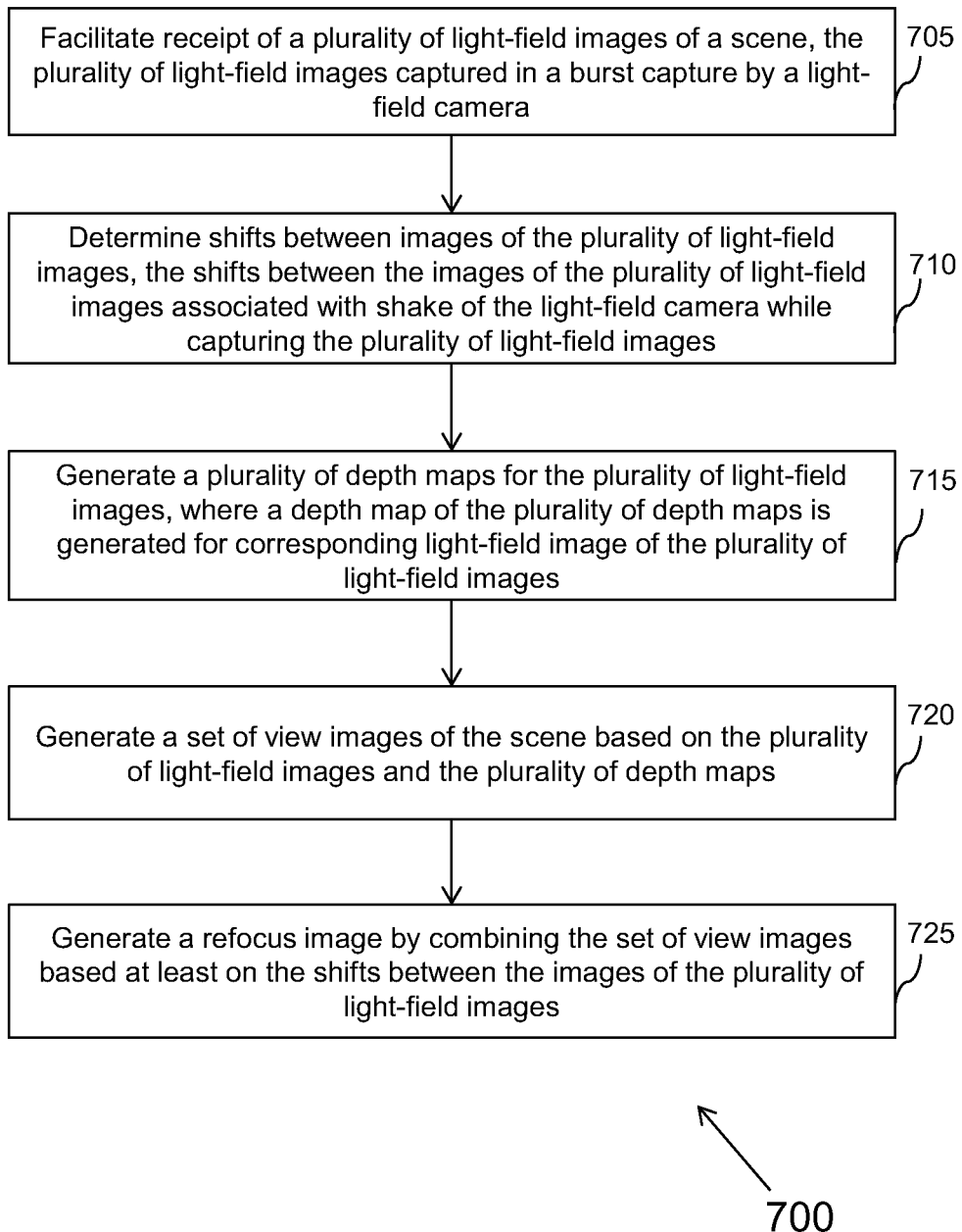
FIG. 7 is a flowchart depicting an example method for image refocusing of images captured from a light-field camera, in accordance with another example embodiment.

FIG. 7 is a flowchart depicting an example method 700 for image refocusing of images captured from a light-field camera, in accordance with an example embodiment. Example references of the FIGS. 2 to 6 may be made for the description of the method 700. The method 700 depicted in the flowchart may be executed by, for example, the apparatus 200 of FIG. 2.

At 705, the method 700 includes facilitating receipt of a plurality of light-field images of a scene. In an example embodiment, the plurality of light-field images may be captured by a light-field camera present in or otherwise accessible to the apparatus 200. In an example embodiment, the plurality of light-field images is captured in a burst capture by the light-field camera.

At 710, the method 700 includes determining shifts between images of the plurality of light-field images (I1-I4) with respect to a reference light-field image selected from the plurality of light-field images. In an example embodiment, the shifts between the images of the plurality of light-field images are associated with shake of the light-field camera while capturing the plurality of light-field images.

At 715, the method 700 includes generating a plurality of depth maps (d1-d4) for the plurality of light-field images (I1-I4), wherein a depth map of the plurality of depth maps (d1-d4) is generated for corresponding light-field image of the plurality of light-field images (I1-I4). For example, the depth maps d1, d2, d3 and d4 may be generated corresponding to the light-field images I1, I2, I3 and I4, respectively.

At 720, the method 700 includes generating a set of view images of the scene based on the plurality of light-field images (I1-I4) and the plurality of depth maps (d1-d4). In an example embodiment, each view image of the set of view images has a distinct view of the scene. In an example embodiment, the set of view images includes a plurality of groups of view images, where each group of view images are generated based on a light-field image of the plurality of light-field images and a corresponding depth map of the light-field image. For example, the method 700 includes generating images I11, I12, I13, I14 based on the image I1 and the depth map d1, generating images I21, I22, I23, I24 based on the image I2 and the depth map d2, generating images I31, I32, I33, I34 based on the image I3 and the depth map d3, and generating images I41, I42, I43, I44 based on the image I4 and the depth map d4.

At 725, the method 700 includes generating a refocus image by combining the set of view images based at least on the shifts between the images of the plurality of light-field images with respect to the reference image. In an example embodiment, the apparatus 200 is caused to generate the refocus image by selecting a view image of the set of view images, shifting the one or more view images of the set of view images corresponding to respective shifts of the one or more view images with respect to the selected view image, and adding the one or more shifted images to the selected image to generate the refocus image.

Figure 8:
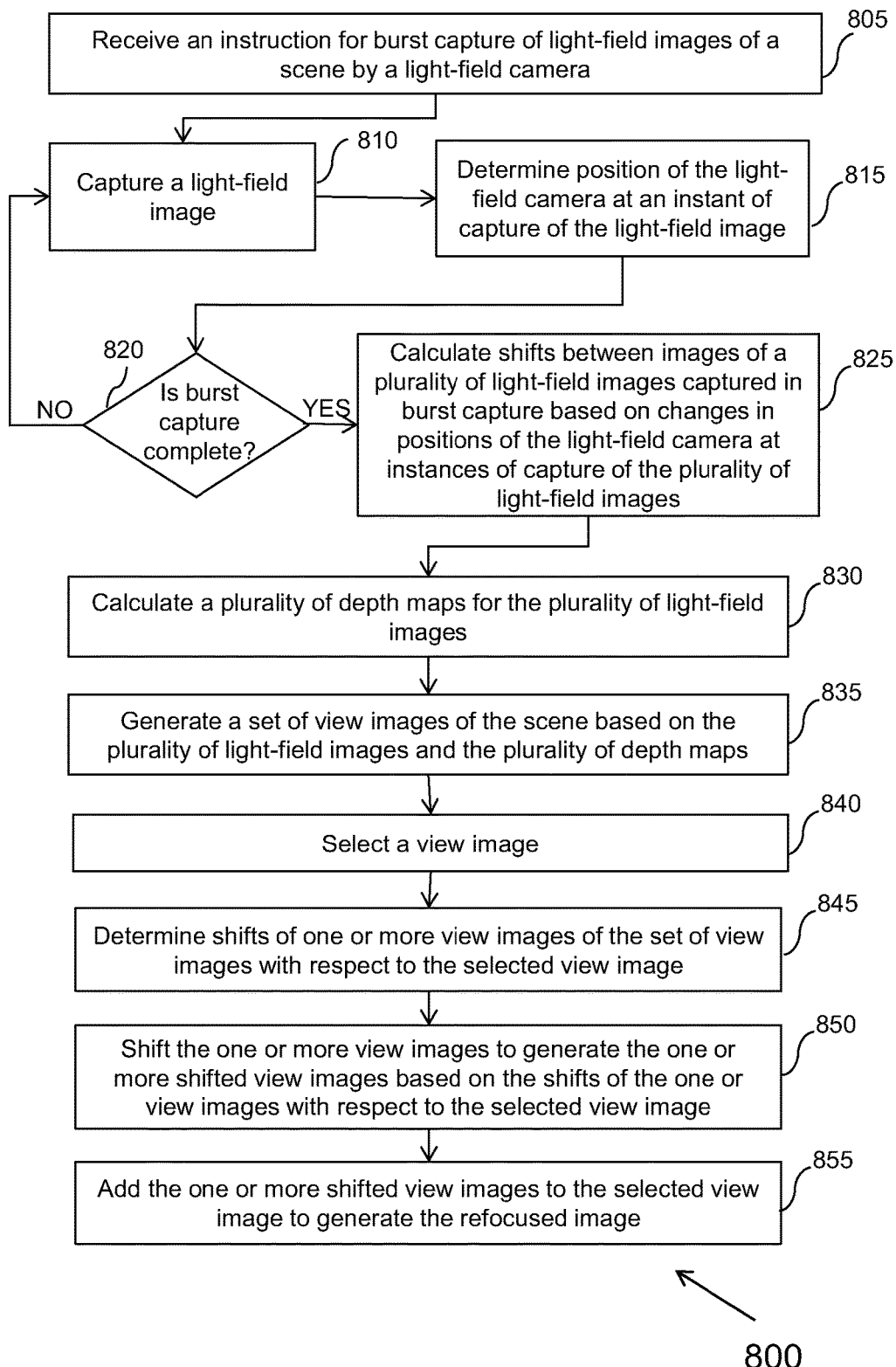
FIG. 8 is a flowchart depicting an example method for image refocusing of images captured from a light-field camera, in accordance with another example embodiment.

FIG. 8 is a flowchart depicting an example method 800 for image refocusing of images captured from a light-field camera, in accordance with another example embodiment. Example references are made to FIGS. 2 to 6 for the description of the method 800. The method 800 depicted in the flowchart may be executed by, for example, the apparatus 200 of FIG. 2.

At 805, the method 800 includes receiving an instruction for burst capture of light-field images of a scene by a light-field camera. At 810, a light-field image (for example, I1) of the scene is captured by the light-field camera. At 815, the method 800 includes determining a position and/or change in position of the light-field camera with respect to a reference position at an instant of capturing the light-field image. At 820, the method 800 checks whether the burst capture is complete. If it is determined that the burst capture is not complete, the method 800 again performs the operation 810 to capture a successive light-field image (for example, I2), and the position of the light-field camera at the instant of capturing the light-field image I2 is determined. Once it is determined that the burst capture is complete, for example, four images I1, I2, I3 and I4 are captured, the method 800 proceeds to 825.

At 825, the method 800 includes calculating the shifts between the images of the plurality of light-field images, based on the changes in the positions of the light-field camera at the instants of capture of the plurality of light-field images (I1-I4).

At 830, the method 800 includes generating a plurality of depth maps (d1, d2, d3 and d4) for the plurality of light-field images (I1-I4), where a depth map of the plurality of depth maps is generated for corresponding light-field image of the plurality of light-field images. For instance, the depth maps d1, d2, d3 and d4 are generated for the light-field images I1, I2, I3, and I4, respectively.

At 835, the method 800 includes generating a set of view images of the scene based on the plurality of light-field images (I1-I4) and the plurality of depth maps (d1-d4). The set of view images includes a plurality of groups of view images, where each group of view images is generated for respective light-field image. For instance, a group of view images for example, I11, I12, I13 and I14 are generated for the light-field image I1. Similarly, a group of view images I21, I22, I23 and I24 are generated for the light-field image I2, a group of view images I31, I32, I33 and I34 are generated for the light-field image I3, and a group of view images I41, I42, I43 and I44 are generated for the light-field image I4.

At 840, the method 800 includes selecting a view image, for example I11, from the set of view images for generating a refocus image. At 845, the method 800 includes determining shifts of one or more view images of the set of view images with respect to the selected view image. For instance, shifts of the one or more view images, for example, images I21, I31 and I42 are determined with respect to the selected view image I11.

At 850, the method 800 includes shifting the one or more view images to generate the one or more shifted view images based on the shifts of the one or view images with respect to the selected view image I11. For instance, the shifted view images I21', I31', I42' are generated by shifting the images I21, I31 and I42 based on the S(I21, I11), S(I31, I11) and S(I42, I11), respectively, where S(I21, I11) represents shift between the image I21 and I11, S(I31, I11) represents shift between the image I31 and I11, and S(I42, I11) represents shift between the image I42 and I11.

At 855, the method 800 includes adding the one or more shifted view images (I21', I31', I42') to the selected view image (I11) to generate the refocus image. In an example embodiment, the method 800 also includes determining a refined depth map based on the set of view images I11, I12, I13 and I14, I21, I22, I23 and I24, I31, I32, I33 and I34, I41, I42, I43 and I44.

Figure 9:
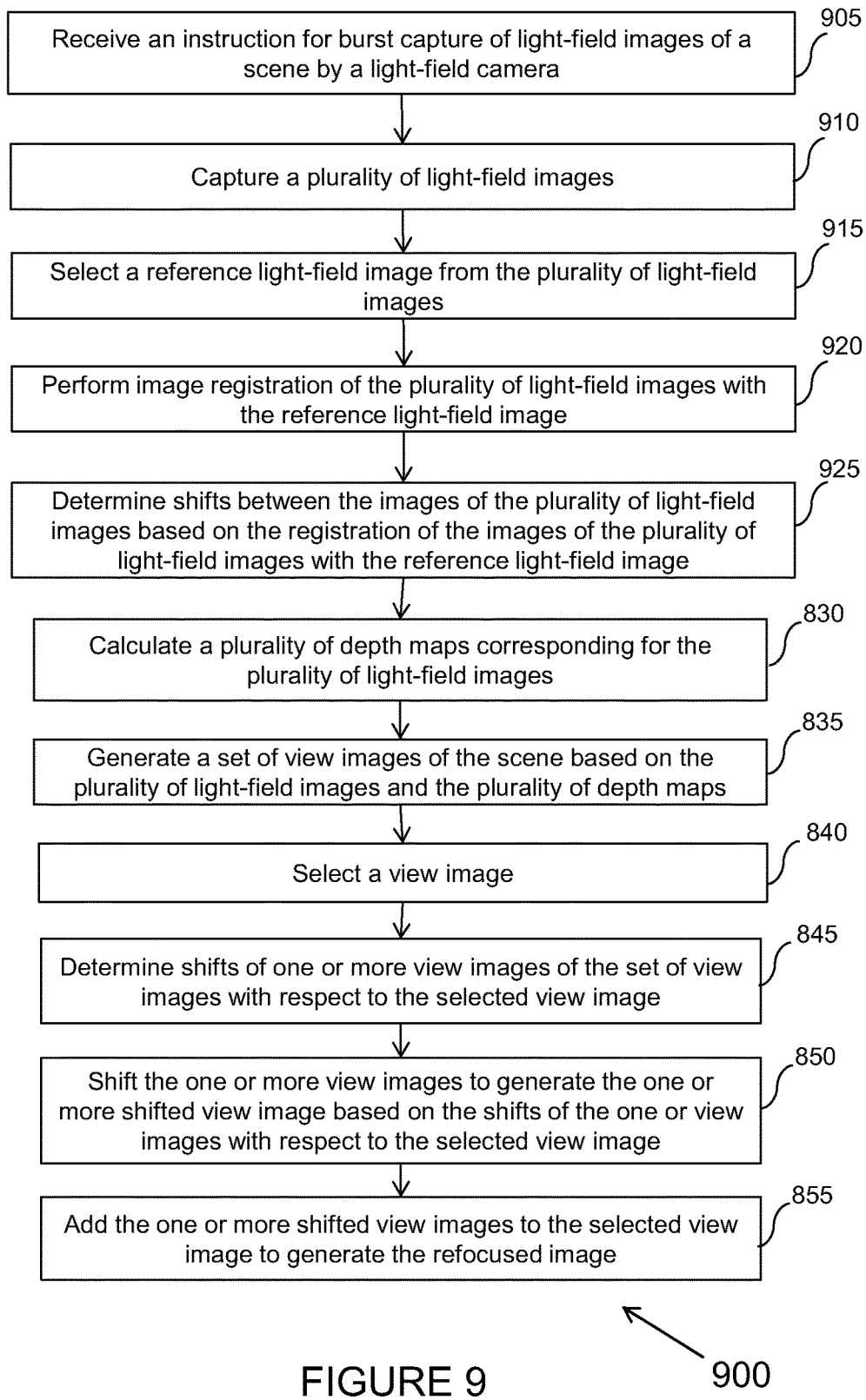
FIG. 9 is a flowchart depicting an example method for image refocusing of images captured from a light-field camera, in accordance with another example embodiment.

FIG. 9 is a flowchart depicting an example method 900 for image refocusing of images captured from a light-field camera, in accordance with another example embodiment. Example references are made to FIGS. 2 to 8 for the description of the method 900. The method 900 depicted in the flowchart may be executed by, for example, the apparatus 200 of FIG. 2.

At 905, the method 900 includes receiving instructions for burst capture of light-field images of a scene by a light-field camera. At 910, the method 900 includes capturing a plurality of light-field images (I1, I2, I3 and I4) of a scene. In an example embodiment, the plurality of light-field images (I1-I4) may be captured by a light-field camera in the burst capture manner, whether the light-field camera is present in or otherwise accessible to the apparatus 200.

At 915, the method 900 includes selecting a reference light-field image from the plurality of light-field images (I1-I4). For instance, light-field image I1 may be selected as the reference light-field image. At 920, the method 900 includes performing image registration of the plurality of light-field images (I1-I4) with the reference light-field image (I1). At 925, the method 900 includes determining shifts between the images of the plurality of light-field images (I1-I4) based on the registration of the images of the plurality of light-field images (I1-I4) with the reference light-field image (I1).

As the shifts between the images of the plurality of light-field images (I1-I4) are determined, the method 900 includes operations of blocks 830, 835, 840, 850 and 855 to generate a refocus image. One or more example embodiments of the operations of the blocks 830, 835, 840, 850 and 855 are further explained with reference to FIG. 8.

It should be noted that to facilitate discussions of the flowcharts of FIGS. 7 to 9, certain operations are described herein as constituting distinct steps performed in a certain order. Such implementations are examples only and non-limiting in scope. Certain operation may be grouped together and performed in a single operation, and certain operations can be performed in an order that differs from the order employed in the examples set forth herein. Moreover, certain operations of the methods 700, 800 and 900 are performed in an automated fashion. These operations involve substantially no interaction with the user. Other operations of the methods 700, 800 and 900 may be performed by in a manual fashion or semi-automatic fashion. These operations involve interaction with the user via one or more user interface presentations.

The methods depicted in these flow charts may be executed by, for example, the apparatus 200 of FIG. 2. Operations of the flowchart, and combinations of operation in the flowcharts, may be implemented by various means, such as hardware, firmware, processor, circuitry and/or other device associated with execution of software including one or more computer program instructions. For example, one or more of the procedures described in various embodiments may be embodied by computer program instructions. In an example embodiment, the computer program instructions, which embody the procedures, described in various embodiments may be stored by at least one memory device of an apparatus and executed by at least one processor in the apparatus. Any such computer program instructions may be loaded onto a computer or other programmable apparatus (for example, hardware) to produce a machine, such that the resulting computer or other programmable apparatus embody means for implementing the operations specified in the flowchart. These computer program instructions may also be stored in a computer-readable storage memory (as opposed to a transmission medium such as a carrier wave or electromagnetic signal) that may direct a computer or other programmable apparatus to function in a particular manner, such that the instructions stored in the computer-readable memory produce an article of manufacture the execution of which implements the operations specified in the flowchart. The computer program instructions may also be loaded onto a computer or other programmable apparatus to cause a series of operations to be performed on the computer or other programmable apparatus to produce a computer-implemented process such that the instructions, which execute on the computer or other programmable apparatus, provide operations for implementing the operations in the flowchart. The operations of the methods are described with help of apparatus 200. However, the operations of the methods can be described and/or practiced by using any other apparatus.

Without in any way limiting the scope, interpretation, or application of the claims appearing below, a technical effect of one or more of the example embodiments disclosed herein is to utilize the shake in the light-field camera while capturing burst images to generate improved refocus images and to obtain enhanced depth estimation, which are otherwise possible only by employing a light-field camera having larger track length (distance between the main lens and the sensor). Various embodiments are capable of utilizing the shifts between the light-field images to generate refocus images, thereby reducing need for having larger track length and such setup of the light-field camera can be integrated in small hand-held devices, for example mobile phones.

Various embodiments described above may be implemented in software, hardware, application logic or a combination of software, hardware and application logic. The software, application logic and/or hardware may reside on at least one memory, at least one processor, an apparatus or, a computer program product. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of an apparatus described and depicted in FIGS. 1 and/or 2. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the embodiments are set out in the independent claims, other aspects comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present disclosure as defined in the appended claims.

What is claimed is:

1. A method comprising:
   determining shifts between images of a plurality of light-field images captured in a burst capture by a light-field camera, the shifts between the images of the plurality of light-field images being associated with shake of the light-field camera while capturing the plurality of light-field images;
   generating a plurality of depth maps for the plurality of light-field images, wherein a depth map of the plurality of depth maps is generated for a corresponding light-field image of the plurality of light-field images;

generating a set of view images of the scene based on the plurality of light-field images and the plurality of depth maps, wherein the set of view images includes at least a first view image generated based on a first of the light-field images and a second view image generated based on a second of the light-field images; and generating a refocus image by combining the first view image and the second view image, the second view image having been shifted based on a shift between the first view image and a non-shifted version of the second view image, wherein the shift between the first view image and the non-shifted version of the second view image is dependent on the determined shift between the first light-field image and the second light-field image.

2. The method as claimed in claim 1, wherein determining the shifts comprises:

determining positions of the light-field camera based on one or more positional measurements of the light-field camera at instants of capturing the plurality of light-field images; and calculating the shifts between the images of the plurality of light-field images, based on the changes in the positions of the light-field camera at the instants of capturing the images of the plurality of light-field images.

3. The method as claimed in claim 2, wherein the one or more positional measurements are performed by a gyroscope.

4. The method as claimed in claim 1, wherein determining the shifts comprises:

selecting a reference light-field image from the plurality of light-field images;

performing image registration of the plurality of light-field images with the reference light-field image; and determining the shifts between the images of the plurality of light-field images based on the registration of the images of the plurality of light-field images with the reference light-field image.

5. The method as claimed in claim 1, further comprising generating a refined depth map based at least on the plurality of images and the set of images.

6. The method as claimed in claim 1, wherein the set of view images comprises one or more groups of view images, wherein each group of view images of the one or more groups of view images is associated with a light-field image of the plurality of light-field images.

7. The method as claimed in claim 1, wherein generating the refocus image comprises:

selecting a view image from the set of view images;

shifting the one or more view images of the set of view images corresponding to respective shifts of the one or more view images with respect to the selected view image; and adding the one or more shifted view images to the selected view image to generate the refocus image.

8. The method as claimed in claim 1, wherein facilitating the burst capture of the plurality of images comprises storing a plurality of light-field image data, wherein each light-field image data comprises a plurality of sub-images captured through a plurality of micro-lenses of a micro-lens array of the light-field camera.

9. The method as claimed in claim 1, wherein the shift between the first view image and the non-shifted version of the second view image is the determined shift between the first light-field image and the second light-field image plus a shift between the non-shifted version of the second view image and a further view image generated based on the second light-field image.

10. The method as claimed in claim 1, wherein generating the set of view images comprises generating the set of views by concatenating at least one corner pixel of one or more sub-images of the plurality of light-field images.

11. An apparatus comprising:

at least one processor; and at least one memory comprising computer program code, the at least one memory and the computer program code configured to, with the at least one processor, cause the apparatus to at least perform:

determine shifts between images of a plurality of light-field images captured in a burst capture by a light-field camera, the shifts between the images of the plurality of light-field images being associated with shake of the light-field camera while capturing the plurality of light-field images;

generate a plurality of depth maps for the plurality of light-field images, wherein a depth map of the plurality of depth maps is generated for a corresponding light-field image of the plurality of light-field images;

generate a set of view images of the scene based on the plurality of light-field images and the plurality of depth maps, wherein the set of view images includes at least a first view image generated based on a first of the light-field images and a second view image generated based on a second of the light-field; and generate a refocus image by combining the first view image and the second view image, the second view image having been shifted based on a shift between the first view image and a non-shifted version of the second view image, wherein the shift between the first view image and the non-shifted version of the second view image is dependent on the determined shift between the first light-field image and the second light-field image.

12. The apparatus as claimed in claim 11, wherein the apparatus is further caused, at least in part to:

determine positions of the light-field camera based on one or more positional measurements of the light-field camera at instants of capturing the plurality of light-field images; and calculate the shifts between the images of the plurality of light-field images, based on the changes in the positions of the light-field camera at the instants of capturing the images of the plurality of light-field images.

13. The apparatus as claimed in claim 12, wherein the one or more positional measurements are performed by a gyroscope.

14. The apparatus as claimed in claim 11, wherein for determining the shifts the apparatus is further caused, at least in part to:

select a reference light-field image from the plurality of light-field images;

perform image registration of the plurality of light-field images with the reference light-field image; and determine the shifts between the images of the plurality of light-field images based on the registration of the images of the plurality of light-field images with the reference light-field image.

15. The apparatus as claimed in claim 11, wherein the apparatus is further caused, at least in part to generate a refined depth map based at least on the plurality of images and the set of images.

16. The apparatus as claimed in claim 11, wherein the set of view images comprises one or more groups of view images, wherein each group of view images of the one or more groups of view images is associated with a light-field image of the plurality of light-field images.

17. The apparatus as claimed in claim 11, wherein for generating, the apparatus is further caused, at least in part to:
   selecting a view image from the set of view images;
   shifting the one or more view images of the set of view images corresponding to respective shifts of the one or more view images with respect to the selected view image; and
   adding the one or more shifted view images to the selected view image to generate the refocus image.

18. The apparatus as claimed in claim 11, wherein for facilitating the burst capture, the apparatus is further caused, at least in part to:
   store a plurality of light-field image data, wherein each light-field image data comprises a plurality of sub-images captured through a plurality of micro-lenses of a micro-lens array of the light-field camera.

19. The apparatus as claimed in claim 11, wherein the shift between the first view image and the non-shifted version of the second view image is the determined shift between the first light-field image and the second light-field image plus a shift between the non-shifted version of the second view image and a further view image generated based on the second light-field image.

20. The apparatus as claimed in claim 11, wherein generating the set of view images comprises generating the set of views by concatenating at least one corner pixel of one or more sub-images of the plurality of light-field images.

21. A computer program product comprising at least one non-transitory computer-readable storage medium, the non-transitory computer-readable storage medium comprising a set of instructions, which, when executed by one or more processors, cause an apparatus to at least perform:
   determine shifts between images of a plurality of light-field images captured in a burst capture by a light-field camera, the shifts between the images of the plurality of light-field images being associated with shake of the light-field camera while capturing the plurality of light-field images;
   generate a plurality of depth maps for the plurality of light-field images, wherein a depth map of the plurality of depth maps is generated for a corresponding light-field image of the plurality of light-field images;
   generate a set of view images of the scene based on the plurality of light-field images and the plurality of depth maps, wherein the set of view images includes at least a first view image generated based on a first of the light-field images and a second view image generated based on a second of the light-field images; and
   generate a refocus image by combining the first view image and the second view image, the second view image having been shifted based on a shift between the first view image and a non-shifted version of the second view image, wherein the shift between the first view image and the non-shifted version of the second view image is dependent on the determined shift between the first light-field image and the second light-field image.

22. The computer program product as claimed in claim 21, wherein the apparatus is further caused, at least in part to:
   determine positions of the light-field camera based on one or more positional measurements of the light-field camera at instants of capturing the plurality of light-field images; and
   calculate the shifts between the images of the plurality of light-field images, based on the changes in the positions of the light-field camera at the instants of capturing the images of the plurality of light-field images.

23. The computer program product as claimed in claim 21, wherein for determining the shifts the apparatus is further caused, at least in part to:
   select a reference light-field image from the plurality of light-field images;
   perform image registration of the plurality of light-field images with the reference light-field image; and
   determine the shifts between the images of the plurality of light-field images based on the registration of the images of the plurality of light-field images with the reference light-field image.

24. The computer program product as claimed in claim 21, wherein for generating, the apparatus is further caused, at least in part to:
   select a view image from the set of view images;
   shifting the one or more view images of the set of view images corresponding to respective shifts of the one or more view images with respect to the selected view image; and
   adding the one or more shifted view images to the selected view image to generate the refocus image.

25. The computer program product as claimed in claim 21, wherein the shift between the first view image and the non-shifted version of the second view image is the determined shift between the first light-field image and the second light-field image plus a shift between the non-shifted version of the second view image and a further view image generated based on the second light-field image.

26. The computer program product as claimed in claim 21, wherein generating the set of view images comprises generating the set of views by concatenating at least one corner pixel of one or more sub-images of the plurality of light-field images.

* * * * *